United States Patent [19]

Akahoshi

[11] Patent Number: 4,765,665
[45] Date of Patent: Aug. 23, 1988

[54] BUMPER STRUCTURE

[75] Inventor: Teruhiko Akahoshi, Isehara, Japan

[73] Assignee: Nissan Motor Co., Ltd., Yokohama, Japan

[21] Appl. No.: 947,918

[22] Filed: Dec. 30, 1986

[30] Foreign Application Priority Data

Jan. 23, 1986 [JP] Japan .................................. 61-7217[U]

[51] Int. Cl.⁴ .............................................. B60R 19/08
[52] U.S. Cl. .................................... 293/102; 293/121; 293/155
[58] Field of Search ............... 293/102, 120, 121, 122, 293/1, 154, 155

[56] References Cited
U.S. PATENT DOCUMENTS 3,734,554  5/1973  Schwabenlender .................. 293/121

FOREIGN PATENT DOCUMENTS

| 59-62061 | 4/1984 | Japan . | |
| 0156845 | 9/1984 | Japan | 293/121 |
| 2033535 | 5/1980 | United Kingdom | 293/120 |
| 2081653 | 2/1982 | United Kingdom | 293/121 |

Primary Examiner—Robert B. Reeves
Assistant Examiner—Russell D. Stormer
Attorney, Agent, or Firm—Foley & Lardner, Schwartz, Jeffery, Schwaab, Mack, Blumenthal & Evans

[57] ABSTRACT

A bumper structure comprises an outer member forming the outside portion of the bumper, a reinforcing device disposed inside the outer member to support and reinforce the outer member, and a spacer for connecting the outer member to the reinforcing device and having a shape changed in accordance with the change of the shape of the outer member.

12 Claims, 3 Drawing Sheets

BUMPER STRUCTURE

BACKGROUND OF THE INVENTION

1. Field of the Invention

The present invention relates to a bumper structure for motor vehicles.

2. Description of the Prior Art

Bumpers are provided in the front and rear of the body of a motor vehicle for such purposes as protection of the vehicle against damage due to collision with an object or due to collision between vehicles, finishing of external appearance of an armor design, or protection of pedestrians.

In FIG. 1 and FIG. 2 there is shown the conventional installing structure of the bumper in the front and rear of the vehicle body. First, a bumper fascia 1 is molded with cross section of approximate shape of a letter U. A metallic reinforcement 2 is fixed to both ends of the form having the U-shaped cross section, by bolts 3,3 and nuts 4,4, clips, or the like. The reinforcement 2 which has a rectangular bar form is fixed along the bumper fascia 1. An appropriate number of stays 5 are welded to the reinforcement 2, and a construction is given in which the bumper is attached via the stays 5 to the strength members of the frame or body. In FIG. 2, radiator grills 6 are shown by phantom line. Further, the bumper has therein an energy absorbing member 7 made of urethane foam or polystyrene foam (see, for instance, Japanese Laid-Open Utility Model No. 59-62061).

However, shown prior-art bumper structure in the above, there are the following problems when the form or the like of the bumper fascia is changed.

Even for vehicles of the same type and same model, the form of the bumper fascia is varied depending upon the grade or destination. Because of this, the shape of the reinforcement 2 for installing the bumper fascia 1 on the vehicle body has to be changed every time the shape of the bumper fascia 1 is changed. This leads to an increase in the number of facilities, such as the molding machine, which results in an accompanying increase in the manufacturing cost.

SUMMARY OF THE INVENTION

With the above problems in mind, an object of the present invention is to provide a bumper structure which can suppress cost increase in manufacture, without requiring additional equipment such as a molding machine, by making the shape of the reinforcement common, even for changes in the shape of the bumper.

To achieve the above object, the bumper structure of the present invention is characterized in that an attaching plate is fixed along a bumper fascia on the inner side of the top surface part of the bumper fascia. By interposing a spacer between the attaching plate and a bumper reinforcement and by varying the shape of the spacer, it is arranged so as to be able to link the bumper reinforcement with the attaching plate.

DETAILED DESCRIPTION OF THE PREFERRED EMBODIMENTS

Figure 1:
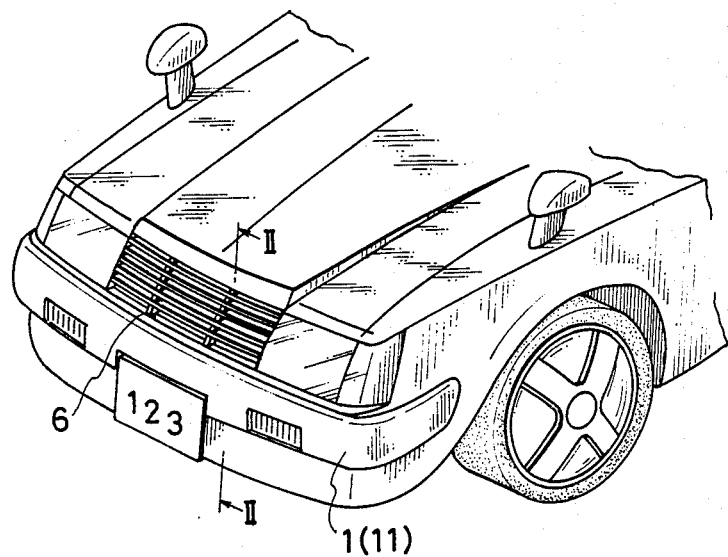
FIG. 1 is a partially omitted perspective view which shows the front part of a vehicle.
Figure 2:
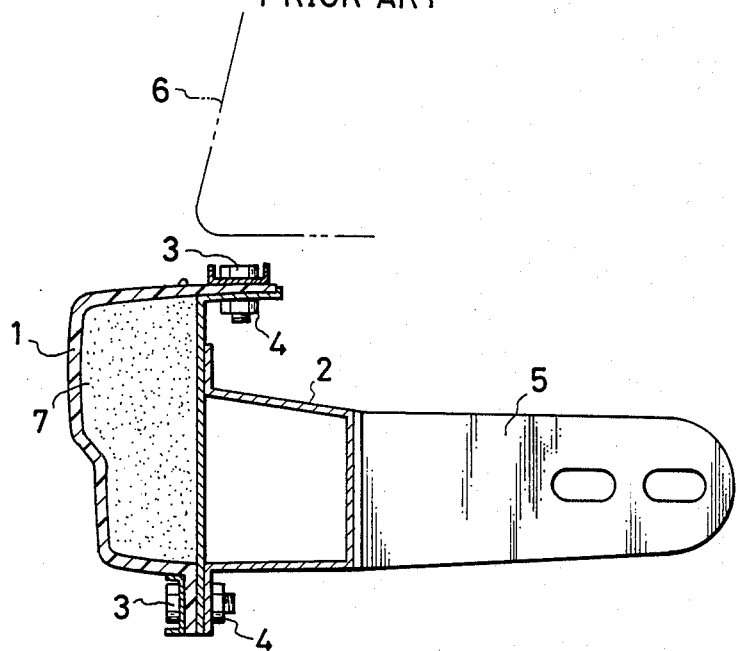
FIG. 2 is the cross sectional view along the line II—II of FIG. 1.
Figure 3:
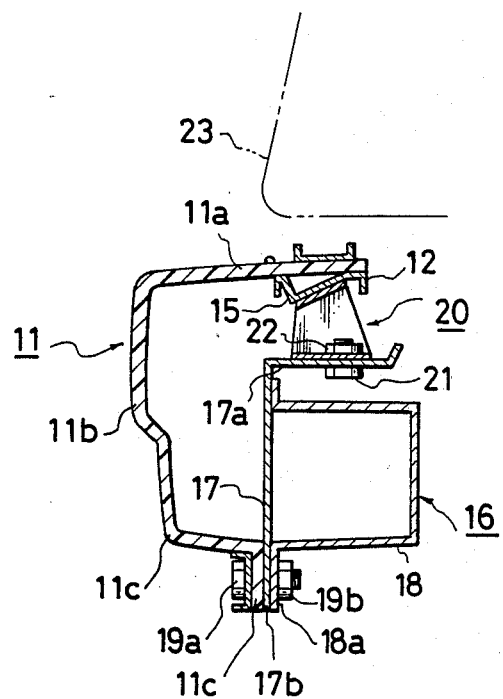
FIG. 3 and FIG. 4 show cross sectional views of the bumper structure of the present invention corresponding to FIG. 2 in which the bumper fascia is shown assembled.
Figure 4:
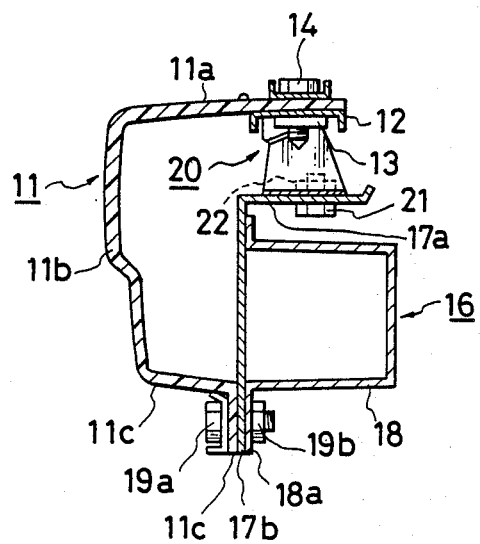
Figure 6:
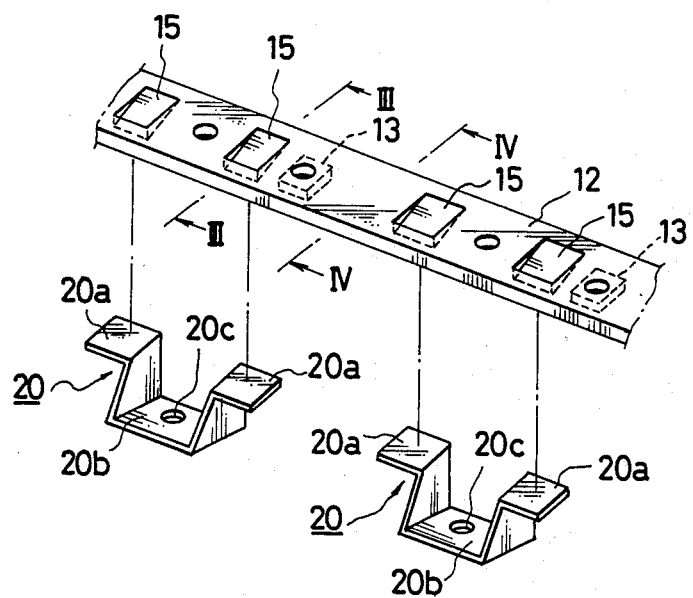
FIG. 6 is a disassembled perspective view of the attaching plate and the spacer, with the cross sectional views along the line III—III and the line IV—IV corresponding to FIG. 3 and FIG. 4, respectively.

Based on a preferred embodiment shown in FIG. 3 and FIG. 6 a bumper structure in accordance with the present invention will be described as follows.

In the figures, 11 is a bumper fascia which has a form whose cross section has an approximate form of a letter U, similar to the conventional fascia. An attaching plate 12 is fixed onto the inside of the upper surface part 11a of the bumper fascia 11. In the present embodiment, there are fixed an appropriate number of welded nuts 13, 13, ... onto the inside of the attaching plate 12. The bumper fascia 11 is fixed to the attaching plate 12 by screwing bolts 14, 14, ... to the welded nuts 13, 13, ... The fixing of the attaching plate 12 may be done by other means such as clips. At appropriate positions of the attaching plate 12, there are formed slantingly recessed portions 15, 15, ... that are recessed with appropriate inclination from the top surface downward. The direction and the angle of inclination of the slantingly recessed portions 15, 15, ... are determined in their relation to the reinforcement that will be described later.

In the figures, 16 is a reinforcement with a constant shape that will not be changed even for a change in the shape of the bumper fascia 11. It is formed in an approximately rectangular bar by welding a reinforcing plate 18 formed by further bending outward the end portions with approximate cross section of a letter U, to a supporting plate 17 that has flanges 17a and 17b. The upper flange portion 17a of the supporting plate 17 is formed by bending it so that it points in the direction opposite to the front portion 11b of the bumper fascia 11, with additional bending of its edge upwardly. The lower flange portion 17b is formed as an extension that is pointed downwardly. By overlapping the edges of the lower flange portion 17b and the reinforcing plate 18 to the lower surface portion 11c of the bumper fascia 11, they are tightly joined using a bolt 19a and a nut 19b.

In the figures, 20 is a spacer interposed between the attaching plate 12 and the upper flange portion 17a of the reinforcement 16. The spacer 20 is formed by a steel plate material that has flanges 20a, 20a (see FIG. 6) shaped by bending the ends of the plate in the shape of approximately a U in cross section and further bending the bent ends in the outward direction. Here, the distance between the flanges 20a and 20a and the distance between a pair of slantingly recessed portions 15 and 15 on the attaching plate 12 are set to be equal. In the central portion 20b of the spacer 20, there is drilled a through hole 20c. Further, by appropriately regulating the angle of inclination of the flange surfaces 20a, 20a with respect to the surface of the center portion 20b, the spacer 20 is accommondated between the slantingly recessed portions 15, 15 of the attaching plate 12 and the upper flange portion 17a.

Further, 21 in the figures is a bolt which penetrates through the upper flange portion 17a of the reinforcement 16 and the through hole 20c provided in the center portion 20b of the spacer 20. The bolt 21 is screwed into a nut 22 placed on the upper surface of the center portion 20b of the spacer 20. Moreover, 23 shown as a doubly dotted line represents radiator grills.

The method for attaching the bumper structure in accordance with the present invention will be described in the following.

The surfaces of the flanges 20a, 20a of the spacer come in contact with the rear surfaces of the slantingly recessed portions 15, 15 formed on the attaching plate 12 and are there spot welded. Next, the center portion 20b of the spacer 20 and the upper flange portion 17a of the reinforcement 16 are joined with the bolt 21 and the nut 22. Then, the end of the upper surface portion 11a of the bumper fascia 11 is fixed to the attaching plate 12, and the lower surface portion 11c is fixed to the lower flange portion 17b of the reinforcement 16.

On the reinforcement 16, there are fixed stays not shown and the installement of the bumper on the body of the vehicle is completed by attaching the stays to the strength members of the frame or the body.

When the shape of the bumper fascia 11 is changed, linkage between the bumper fascia 11 and the reinforcement 16 is achieved similar to the above by changing the size and the shape of the spacer 20.

Figure 5:
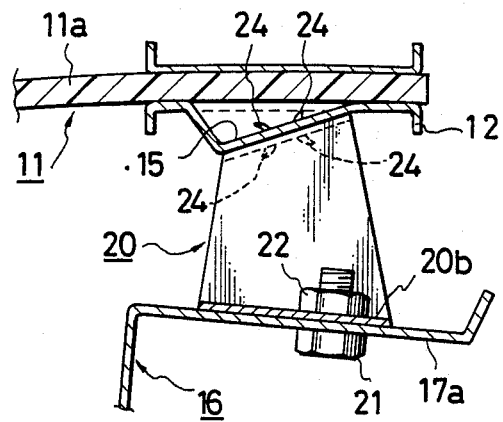
FIG. 5 is an enlarged cross sectional view of an important portion of FIG. 3.

It should be noted that the present embodiment is described in conjunction with the case in which there are formed slantingly recessed portions 15, 15, . . . on the attaching plate 12. However, the slantingly recessed portions 15, 15, . . . may be omitted by appropriately changing the shape or the like of the spacer 20. However, if the slantingly recessed portions 15, 15, . . . are provided, by fixing the spacer 20 to the attaching plate 12 by spot welding, it is possible to avoid expansion and contraction due to changes in temperature. Moreover by having the slantingly recessed portions 15, 15, . . . , even if there appear spills 24, 24, . . . of the welding metal that appear as the external fault of the welding portion, as shown in FIG. 5, blow holes that show themselves up to the surface, detachment of the plate cracks, irregular or singular depressions, distortion of the plate, discoloration of the surface, excessive depth of depressions and mismatching, heat damage due to overheating, pickup or melt-off of the plate surface due to electrode, and so on, these faults will not affect the bumper fascia 11 so that there will not occur distortion of the bumper fascia 11 which is desirable. Further, by appropriately forming the slantingly recessed portions 15, 15, . . . , it becomes possible to make the flange surface and the rear surface of the central portion 20b of the spacer 20 to be parallel with each other, enabling the finishing of the spacer to be easier. Moreover, by smoothing the rear surface of the slantingly recessed portions 15, 15, . . . , accuracy control of the various parts can be made easier. Still further, by the easy accuracy control of the spacer 20, the accuracy control of the upper surface of the bumper fascia 11 in the installation of the bumper fascia 11 on the vehicle body can be carried out easier, and moreover, the close contact with the parts to be installed above it, such as the radiator grills 23, can be facilitated.

The present embodiment is described in connection with the bumper fascia 11 on the front side of the vehicle body. However, similar attaching structure can also be applied to the bumper in the rear.

As described in the foregoing, according to the bumper structure in accordance with the present invention, the reinforcement can be also a strength member for the bumper. Namely, molding of the reinforcement need not be carried out for each bumper shape, and accordingly, the manufacturing cost can be reduced.

What is claimed is:

1. A bumper attachment assembly for attaching to a vehicle body any one of a number of different types of bumper fascia, each having a different height, said assembly comprising:
   an attaching plate adapted to be fixed to an upper inside wall of the bumper fascia along its length;
   a bumper reinforcing member of fixed size mounted to the vehicle body to support and reinforce the bumper fascia; and
   replaceable means for attaching bumper facia of different height to the bumper reinforcing member, comprising a spacer for coupling the attaching plate to the bumper reinforcing member, the spacer having a size in a dimension extending between the attaching plate and the bumper reinforcing member selected to correspond to the difference in height between a selected bumper fascia and the fixed size reinforcing member.

2. A bumper assembly as claimed in claim 1, comprising a plurality of said replaceable attaching means spaced along the length of the bumper reinforcing member.

3. A bumper assembly as claimed in claim 1, wherein the spacer comprises a plate having a generally U shaped cross-section including a base and two legs, the base having a through hole in its central portion for attaching the spacer to the bumper reinforcing member, and a pair of flanges, one disposed outwardly on each leg at its end opposite the base, to attach the spacer to the attaching plate, said flanges being inclined relative to the horizontal in order to receive a shock force on the bumper fascia.

4. A bumper assembly as claimed in claim 2, wherein the attaching plate comprises a base plate portion, and a pair of recessed portions connected to the base plate portion and projecting at a slant toward the spacer and respectively mating and being connected to the pair of the flanges of the spacer.

5. A bumper assembly for a vehicle body comprising:
   a bumper fascia having a length and a cross-section having upper and lower end portions;
   an attaching plate generally extending along the length of the bumper fascia and being connected to the upper end portion on an inner side thereof;
   a bumper reinforcing member mounted to the vehicle body and being connected to the lower end portion of the bumper fascia, the bumper reinforcing member having a size such that it is positioned between the lower end portion of the bumper fascia and the attaching plate and forms a space between the bumper reinforcing member and the attaching plate; and
   a plurality of spacers spaced apart along the length of the attaching plate and being fitted into the space to couple the attaching plate to the bumper reinforcing member, the spacer having a shpae suitable to be mated with the bumper reinforcing member and the attaching plate.

6. A bumper assembly of claim 5, wherein the spacers and the attaching plate are integrally connected to each other by welding, while the bumper fascia is connected to the attaching plate and the reinforcing member by a clamping device including a bolt and nut assembly.

7. A bumper assembly as claimed in claim 5, wherein the spacers have a bearing face through which the attaching plate is connected to the spacers, and the bearing face is inclined relative to the horizontal in order to receive a shock force applied to the bumper fascia.

8. A bumper assembly as claimed in claim 7, wherein the attaching plate comprises a base plate portion connected to the bumper fascia and a pair of slanted portions extending from the base plate portion for connection with the bearing face of the spacer.

9. A bumper assembly as claimed in claim 8, wherein the spacer comprises a central portion having a through hole for connecting the spacer to the bumper reinforcing member, a pair of leg portions extending from the central portion, such that the leg portions and the central portion conjointly form a generally U-shape, and a pair of flange portions disposed on the leg portions at the edges thereof to form the bearing face.

10. A bumper assembly as claimed in claim 5, wherein the bumper reinforcing member comprises a closed tubular body.

11. A method of mounting a bumper fascia to a vehicle body, comprising the steps of:
   providing a bumper reinforcing member which is of a height smaller than that of the bumper fascia;
   mounting the bumper reinforcing member to the vehicle body;
   mounting the bumper fasica at its lower end portion to the reinforcing member;
   providing a plurality of spacers spaced apart from each other along the bumper reinforcing member, the spacers having a bearing face inclined with respect to horizontal to receive a shock froce form the bumper fascia;
   providing an attaching plate to couple the bumper fascia to the spacers, the attaching plate having a base plate portion extending along and connected to the bumper fascia and a slanted portion extending from the base plate portion to mate with the inclined face of each of the spacers;
   integrally connecting the spacers and the attaching plate to conjointly form a shape suitable to mate with the bumper fascia and the bumper reinforcing member;
   positioning the spacers and the attaching plate in combination between the bumper fascia and the bumper reinforcing member; and
   connecting the spacer to the reinforcing member, and connecting the bumper fascia to the attaching plate.

12. The method of claim 11, wherein the step of integrally connecting the spacers and the attaching plate is conducted by welding, and the step of connecting the attaching plate and the spacers to the bumper fascia and the reinforcing member is conducted attaching a clamping device including a bolt and nut assembly.

* * * * *